(12) United States Patent
Nagaraj et al.

(10) Patent No.: US 11,368,399 B2
(45) Date of Patent: Jun. 21, 2022

(54) CONGESTION AWARE MULTIPATHING BASED ON NETWORK CONGESTION NOTIFICATIONS

(71) Applicant: EMC IP Holding Company LLC, Hopkinton, MA (US)

(72) Inventors: Venkatesh Doddamane Nagaraj, Bangalore (IN); Peniel Charles, Bangalore (IN); Kurumurthy Gokam, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 28 days.

(21) Appl. No.: 16/832,124

(22) Filed: Mar. 27, 2020

(65) Prior Publication Data
US 2021/0306268 A1   Sep. 30, 2021

(51) Int. Cl.
*H04L 12/801* (2013.01)
*H04L 47/12* (2022.01)
*H04L 45/24* (2022.01)

(52) U.S. Cl.
CPC ............. *H04L 47/12* (2013.01); *H04L 45/24* (2013.01)

(58) Field of Classification Search
CPC ....... H04L 47/12; H04L 45/24; H04L 47/122; H04L 47/115
See application file for complete search history.

(56) References Cited

U.S. PATENT DOCUMENTS

| 6,567,397 B1 | 5/2003 | Campana et al. |
| 6,687,746 B1 | 2/2004 | Shuster et al. |
| 6,697,875 B1 | 2/2004 | Wilson |
| 7,275,103 B1 | 9/2007 | Thrasher et al. |
| 7,454,437 B1 | 11/2008 | Lavallee et al. |

(Continued)

FOREIGN PATENT DOCUMENTS

| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Donald L Mills
(74) *Attorney, Agent, or Firm* — Ryan, Mason & Lewis, LLP

(57) ABSTRACT

An apparatus comprises a host device comprising a processor coupled to memory. The host device is configured to obtain a network congestion notification from a portion of a network that is utilized by the host device for submitting IO operations to a storage system. The network congestion notification comprises an indication that the portion of the network is experiencing network congestion. The host device is further configured to identify a first path of a plurality of paths as a path that utilizes the portion of the network and to adjust a dispatch weight of the first path based at least in part on the network congestion notification. The host device is further configured to submit an IO operation to the storage system along a second path instead of the first path based at least in part on the adjusted dispatch weight of the first path.

20 Claims, 3 Drawing Sheets

(56) References Cited

U.S. PATENT DOCUMENTS

| | | | |
|---|---|---|---|
| 7,617,292 | B2 | 11/2009 | Moore et al. |
| 7,668,981 | B1 | 2/2010 | Nagineni et al. |
| 7,770,053 | B1 | 8/2010 | Bappe et al. |
| 7,809,912 | B1 | 10/2010 | Raizen et al. |
| 7,818,428 | B1 | 10/2010 | Lavallee et al. |
| 7,890,664 | B1 | 2/2011 | Tao et al. |
| 7,904,681 | B1 | 3/2011 | Bappe et al. |
| 7,925,872 | B2 | 4/2011 | Lai et al. |
| 8,250,256 | B2 | 8/2012 | Ghosalkar et al. |
| 8,285,825 | B1 | 10/2012 | Nagaraj et al. |
| 8,825,919 | B1 | 9/2014 | Lim et al. |
| 8,832,334 | B2 | 9/2014 | Okita |
| 8,874,746 | B1 | 10/2014 | Gonzalez |
| 9,026,694 | B1 | 5/2015 | Davidson et al. |
| 9,201,803 | B1 | 12/2015 | Derbeko et al. |
| 9,400,611 | B1 | 7/2016 | Raizen |
| 9,430,368 | B1 | 8/2016 | Derbeko et al. |
| 9,594,780 | B1 | 3/2017 | Esposito et al. |
| 9,647,933 | B1 | 5/2017 | Tawri et al. |
| 9,672,160 | B1 | 6/2017 | Derbeko et al. |
| 9,778,852 | B1 | 10/2017 | Marshak et al. |
| 10,289,325 | B1 | 5/2019 | Bono |
| 10,353,714 | B1 | 7/2019 | Gokam et al. |
| 10,439,878 | B1 | 10/2019 | Tah et al. |
| 10,474,367 | B1 | 11/2019 | Mallick et al. |
| 10,476,960 | B1 | 11/2019 | Rao et al. |
| 10,521,639 | B2 | 12/2019 | Mallick et al. |
| 11,050,825 | B1* | 6/2021 | Marappan ............... G06F 3/067 |
| 2002/0023151 | A1 | 2/2002 | Iwatani |
| 2002/0103923 | A1 | 8/2002 | Cherian et al. |
| 2004/0010563 | A1 | 1/2004 | Forte et al. |
| 2006/0026346 | A1 | 2/2006 | Kadoiri et al. |
| 2006/0277383 | A1 | 12/2006 | Hayden et al. |
| 2007/0174849 | A1 | 7/2007 | Cheung et al. |
| 2008/0043973 | A1 | 2/2008 | Lai et al. |
| 2008/0201458 | A1 | 8/2008 | Salil |
| 2010/0313063 | A1 | 12/2010 | Venkataraja et al. |
| 2011/0197027 | A1 | 8/2011 | Balasubramanian et al. |
| 2011/0296230 | A1 | 12/2011 | Chen et al. |
| 2012/0102369 | A1 | 4/2012 | Hiltunen et al. |
| 2013/0117766 | A1 | 5/2013 | Bax et al. |
| 2013/0318228 | A1* | 11/2013 | Raja ........................ H04L 41/12 709/224 |
| 2014/0105068 | A1 | 4/2014 | Xu |
| 2015/0222705 | A1 | 8/2015 | Stephens |
| 2015/0242134 | A1 | 8/2015 | Takada et al. |
| 2016/0092136 | A1 | 3/2016 | Balakrishnan et al. |
| 2016/0117113 | A1 | 4/2016 | Li et al. |
| 2016/0335003 | A1 | 11/2016 | Ahmed et al. |
| 2017/0235507 | A1 | 8/2017 | Sinha et al. |
| 2018/0189635 | A1 | 7/2018 | Olarig et al. |
| 2018/0253256 | A1 | 9/2018 | Bharadwaj |
| 2018/0317101 | A1 | 11/2018 | Koue |
| 2019/0095299 | A1 | 3/2019 | Liu et al. |
| 2019/0108888 | A1 | 4/2019 | Sarkar et al. |
| 2019/0230043 | A1* | 7/2019 | Kommula ............. H04L 47/726 |
| 2020/0097203 | A1 | 3/2020 | Mallick et al. |
| 2020/0145349 | A1* | 5/2020 | Menachem ........... H04L 49/505 |
| 2020/0280518 | A1* | 9/2020 | Lee ......................... H04L 47/30 |
| 2021/0152477 | A1* | 5/2021 | Johnsen .............. H04L 47/2433 |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |

OTHER PUBLICATIONS

NVM Express, "NVM Express, Revision 1.3," NVM Express, May 1, 2017, 282 pages.

VMWARE, "Multipathing Configuration for Software iSCSI Using Port Binding," Technical White Paper, Apr. 25, 2012, 15 pages.

DELL EMC, "Dell EMC SC Series Storage: Microsoft Multipath I/O," Dell EMC Engineering, Jun. 2017, 56 pages.

DELL EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

DELL EMC, "PowerMax OS," Dell EMC PowerMax Family Product Guide, May 2019, 192 pages.

DELL EMC, "DELL EMC SC Series Storage and Microsoft Multipath I/O," CML 1004, Jul. 2018, 36 pages.

VMWARE, Inc. "VMware VMFS Volume Management," 2009, 8 pages.

DELL EMC, "Dell EMC Unity: Virtualization Integration," Technical White Paper, Oct. 2019, 39 pages.

DELL EMC, "Dell EMC PowerMax: iSCSI Implementation for Dell EMC Storage Arrays Running PowerMaxOS," Technical White Paper, Sep. 2019, 35 pages.

U.S. Appl. No. 15/795,653 filed in the name of Maneesh Pusalkar et al., filed Oct. 27, 2017, and entitled "Storage System with Network-Wide Configurable Device Names.".

U.S. Appl. No. 16/145,502 filed in the name of Vinay G. Rao et al., filed Sep. 28, 2018, and entitled "Host Device with Multi-Path Layer Implementing Path Selection Based at Least in Part on Fabric Identifiers.".

U.S. Appl. No. 16/155,429 filed in the name of Rimpesh Patel et al., filed Oct. 9, 2018, and entitled "Categorizing Host IO Load Pattern and Communicating Categorization to Storage System.".

U.S. Appl. No. 16/155,491 filed in the name of Kundan Kumar et al., filed Oct. 9, 2018, and entitled "Migrating Control of a Multi-Path Logical Device from a Current MPIO Driver to a Target MPIO Driver.".

U.S. Appl. No. 16/697,393 filed in the name of Vinay G. Rao et al., filed Nov. 27, 2019, and entitled "Automated Seamless Migration of Logical Storage Devices.".

U.S. Appl. No. 16/710,828 filed in the name of Amit Pundalik Anchi et al., filed Dec. 11, 2019, and entitled "Automated Seamless Migration with Signature Issue Resolution.".

* cited by examiner

US 11,368,399 B2

CONGESTION AWARE MULTIPATHING BASED ON NETWORK CONGESTION NOTIFICATIONS

FIELD

The field relates generally to information processing systems, and more particularly to storage in information processing systems.

BACKGROUND

Storage arrays and other types of storage systems are often shared by multiple host devices. A host device may comprise a multi-path input-output (MPIO) driver that is configured to process input-output (IO) operations for delivery from the host device to the storage system. The IO operations are delivered over a network along a plurality of paths to the storage system. In some cases, a portion of the network which is utilized by one or more of the paths may become congested which may inhibit the servicing of the IO operations by the storage system.

SUMMARY

In one embodiment, an apparatus comprises a host device comprising a processor coupled to memory. The host device is configured to obtain a network congestion notification from a portion of a network that is utilized by the host device for submitting input-output operations to a storage system. The network congestion notification comprises an indication that the portion of the network is experiencing network congestion. The host device is further configured to identify a first path of a plurality of paths as a path that utilizes the portion of the network and to adjust a dispatch weight of the first path based at least in part on the network congestion notification. The host device is further configured to submit an input-output operation to the storage system along a second path of the plurality of paths instead of the first path based at least in part on the adjusted dispatch weight of the first path.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
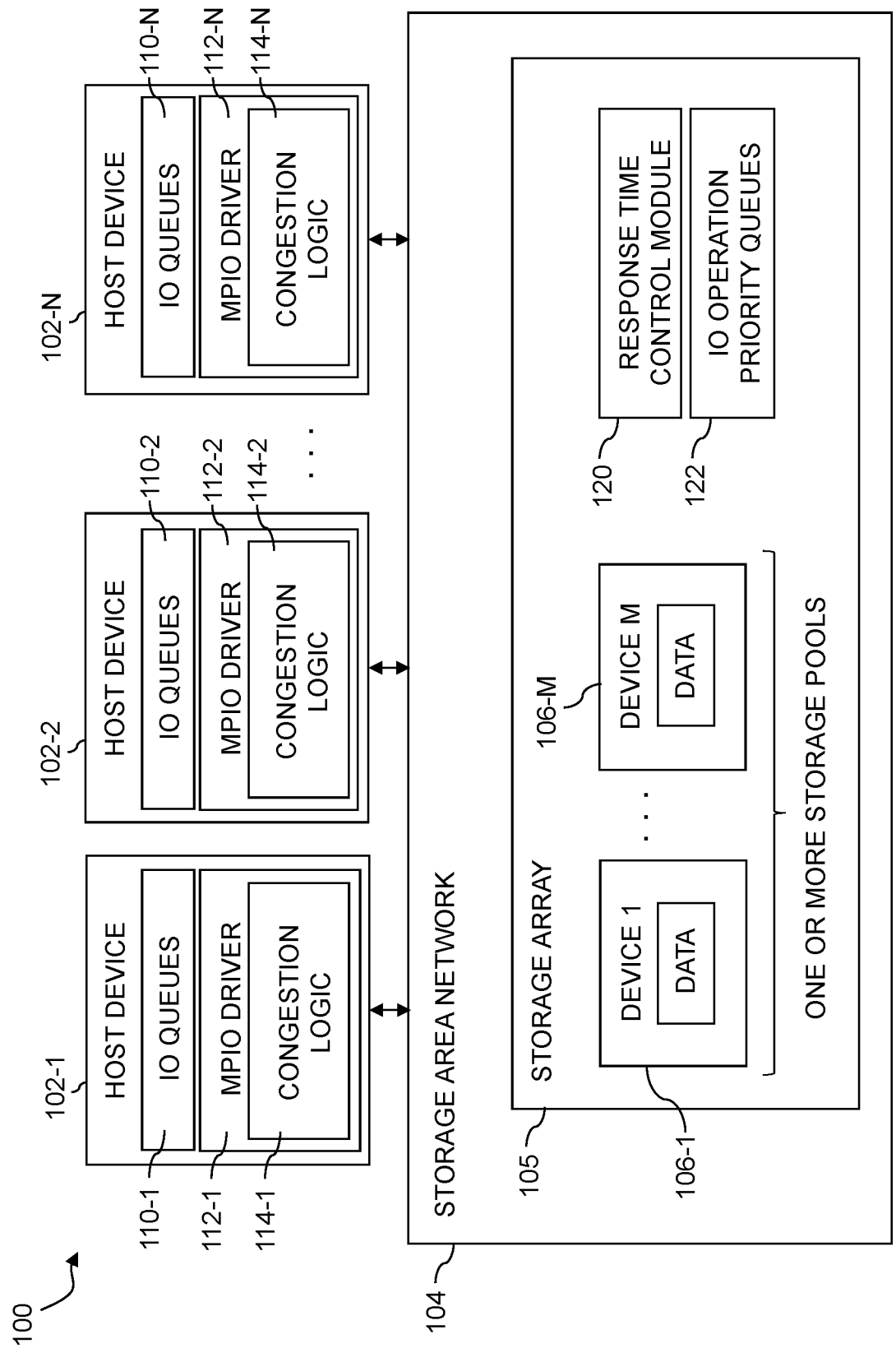
FIG. 1 is a block diagram of an information processing system configured with functionality for congestion aware multipathing based on network congestion notifications in an illustrative embodiment.

FIG. 1 shows an information processing system 100 configured in accordance with an illustrative embodiment. The information processing system 100 comprises a plurality of host devices 102-1, 102-2, . . . 102-N, referred to herein collectively as host devices 102. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 is an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

The storage devices 106 of the storage array 105 of SAN 104 implement logical units or volumes (LUNs) configured to store objects for users associated with the host devices 102. These objects can comprise files, blocks or other types of objects. In illustrative embodiments, the storage devices 106 may comprise one or more clusters of storage devices 106. The host devices 102 interact with the storage array 105 utilizing read and write commands as well as other types of commands that are transmitted over the SAN 104. Such commands in some embodiments more particularly comprise small computer system interface (SCSI) commands or non-volatile memory express (NVMe) commands, depending on the type of storage device, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple IO paths to the storage array 105, with at least one of the storage devices 106 of the storage array 105 being visible to that host device on a given one of the paths. A given one of the storage devices 106 may be accessible to the given host device over multiple IO paths.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for congestion logic 114-1, 114-2, . . . 114-N implemented within the MPIO drivers 112. In some embodiments the congestion logic 114 may alternatively be implemented within the respective host devices 102 separate from the MPIO drivers 112.

MPIO drivers typically group all paths from a host device to a logical volume into a single logical device known as a multi-path logical device. The individual block devices representing each path are known as native devices. Applications use a multi-path logical device for IO operations so that the IO operations may be distributed across all available paths. When paths fail, the MPIO driver will typically redirect the IO operations to other alive paths in the multi-path logical device.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from the respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with the addition of a new storage array or the deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In some embodiments, paths are added or deleted in conjunction with the addition of a new communication adaptor or the removal of an existing communication adaptor from the host device.

In these and other situations, path discovery scans may be performed by the MPIO drivers of the multi-path layer as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

The MPIO drivers utilize the multiple paths described above to send IO operations from the host devices 102 to the storage array 105.

For example, an MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

The MPIO drivers described herein may comprise, for example, otherwise conventional MPIO drivers, such as PowerPath® drivers from Dell EMC, suitably modified in the manner disclosed herein to implement functionality for congestion aware multipathing based on network congestion notifications. Other types of MPIO drivers from other driver vendors may be suitably modified to incorporate functionality for congestion aware multipathing based on network congestion notifications as disclosed herein.

The storage array 105 in the present embodiment is assumed to comprise a persistent memory that is implemented using a flash memory or other types of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array-based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017, and entitled "Storage System with Input-Output Performance Control Utilizing Application Process Detection," which issued as U.S. Pat. No. 10,474,367 on Nov. 12, 2019, the entirety of which is incorporated by reference herein. As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and congestion logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Figure 2:
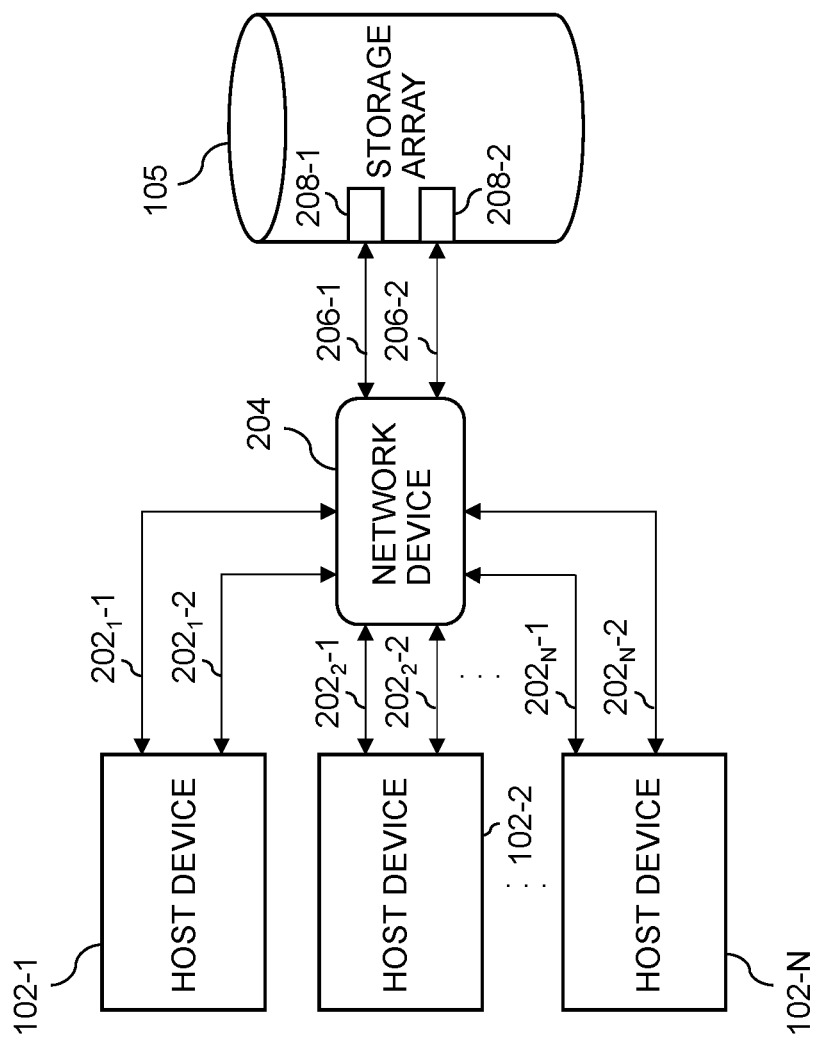
FIG. 2 is a block diagram illustrating an example implementation of the information processing system of FIG. 1 in an illustrative embodiment.

With reference now to FIG. 2, an example configuration of system 100 is illustrated. In FIG. 2, each of the host devices 102 communicates with the ports 208 of the storage array 105 via a plurality of paths over a network fabric which comprises, for example, communication links 202, one or more network devices 204, e.g., switch, routers or other network devices, and communication links 206. While the example of FIG. 2 only illustrates a single switch, two ports, and a number of communication links, any other number of each of these components may also be present in the storage system and utilized to provide communications between the host devices 102 and the storage array 105.

In the illustrated example, host device 102-1 is connected to the network device 204 using communication links 2021-1 and 2021-2, host device 102-2 is connected to the network device 204 using communication links 2022-1 and 2022-2, and host device 102-N is connected to the network device 204 using communication links 202N-1 and 202N-2. Network device 204 is connected to port 208-1 of the storage array 105 using communication link 206-1 and is connected to port 208-2 of the storage array 105 using communication link 206-2. A given path between a host device and the storage array 105 utilizes one of the communication links 202, the network device 204, one of the communication links 206 and one of the corresponding connected ports 208. Although not illustrated in FIG. 2, each host device may also comprise an HBA connected to at least one of the communication links 202 which may be described as an initiator of a path. Each port 208 may likewise be described as a target of a path.

As an example, a first path between host device 102-1 and storage array 105 in the example of FIG. 2 may comprise communication link 2021-1, network device 204, communication link 206-1 and port 208-1. A second path between host device 102-1 and storage array 105 in the example of FIG. 2 may comprise communication link 2021-1, network device 204, communication link 206-2 and port 208-2. A third path between host device 102-1 and storage array 105 in the example of FIG. 2 may comprise communication link 2021-2, network device 204, communication link 206-1 and port 208-1. A fourth path between host device 102-1 and storage array 105 in the example of FIG. 2 may comprise communication link 2021-2, network device 204, communication link 206-2 and port 208-2. In this example, there are four available paths between host device 102-1 and storage array 105. Host devices 102-2, . . . 102-N may have available paths described in a similar manner. In other examples embodiments, where there are a smaller or larger numbers of communication links 202, network devices 204, communication links 206, or ports 208 between the host devices 102 and the storage array 105, a smaller or larger number of paths may alternatively be available.

During load balancing, MPIO drivers on host devices typically react to a timeout or other failure of an IO operation submitted along a path by performing a failover of the IO operation to another path. However, these MPIO drivers often fail to take into account the congestion that is occurring in a particular portion of the network fabric, such as, e.g., a switch, router, communication links or other component of the network fabric. These failover techniques typically select a new path for the failed IO operation that is as remote as possible from the current path, e.g., that uses a different port of the storage array, different network fabric components, and different hardware bus adapter on the host device. However, such a failover technique typically does not know the state of the network fabric for the new path during the failover or load balancing of IO operations which may lead to performance degradation and can contribute to further congestion. For example, if the new path is already congested, further failover attempts may be required after the IO operations submitted along the new path time out.

Logical volumes of the storage array 105 may be exposed to the host device 102-1 over the network fabric using a network protocol such as, e.g., a transmission control protocol (TCP), a remote direct memory access (RDMA) over converged ethernet (RoCE) protocol, an NVMeOF protocol which utilizes TCP, an iSCSI protocol or another network protocol.

In illustrative embodiments, the congestion logic 114-1 of host device 102-1 is configured to obtain network fabric congestion information via one or more network congestion notifications such as, e.g., explicit congestion notifications (ECNs), which are generated by one or more components of the network fabric. For example, an HBA of the host device 102-1 may be configured to obtain a network congestion notification from a component of the network fabric such as, e.g., network device 204. The congestion logic 114-1 is configured to obtain the network congestion notification from the HBA of the host device 102-1. In some embodiments, the congestion logic 114-1 may obtain the network congestion notification from the component of the network fabric without using the HBA, e.g., by utilizing an alternative communication pathway.

The network congestion notification comprises an indication that a portion of the network is experiencing congestion. For example, the network congestion notification may comprise an indication that the particular component from which it has been obtained is experiencing congestion. In some embodiments, the network congestion notification may also or alternatively comprise an indication that a portion of the network fabric other than the particular component from which it has been obtained is experiencing congestion.

The congestion logic 114-1, having obtained the network congestion notification, is configured to utilize this information to assist the MPIO driver 112-1 when performing load balancing or failover of IO operations. For example, the congestion logic 114-1 is configured to determine which paths utilize the congested portion of the network based at least in part on the network congestion notification and to provide this information to the MPIO driver 112-1 for failover and load balancing purposes. The MPIO driver 112-1 may be configured, for example, to stop dispatching IO operations along paths which utilize the congested portion of the network, to reduce the volume or size of IO operations being dispatched along paths which utilize the congested portion of the network, to dispatch priority or critical IO operations along paths which utilize the congested portion of the network while submitting other less prioritized IO operations along other paths, to dispatch priority IO operations along the paths that utilize the congested portion of the network while dispatching both priority and non-priority IO operations along the paths that utilize uncongested portions of the network or to take other similar action. The uncongested portions of the network may comprise, for example, the portions for which network congestion notifications have not been recently obtained by the congestion logic 114-1. For example, if no network congestion notifications have been received from a portion of the network for a threshold amount of time, e.g., seconds, minutes, hours, days, etc., this portion may be considered uncongested by the congestion logic 114-1.

By making failover and load balancing determinations based at least in part on the network congestion notifications that are generated and obtained from the network components of the network fabric, the efficiency of the system may be improved since the MPIO drivers 112-1 will know which paths utilize congested portions of the network and can dispatch IO operations accordingly in a way that either avoids the congested portion of the network entirely, or reduces the load on the congested portion of the network, e.g., by only sending priority IO operations and re-routing non-prioritized IO operations, which helps alleviate the congestion. Once the congestion has been reduced below a threshold amount of congestion, network congestion notifications will no longer be received from that portion of the network and the MPIO driver 112-1 may resume full use of the paths that utilize that portion of the network for submitting IO operations to the storage system.

In an example scenario, the MPIO drive 112-1 is aware of current network fabric congestion state based at least in part on the network congestion notifications obtained by the congestion logic 114-1. When a new network congestion notification is obtained by the congestion logic 114-1 and the corresponding paths are identified, the MPIO driver 112-1 may avoid utilizing these paths for dispatching IO operations. For example, the MPIO driver 112-1 may adjust the dispatch weights associated with the identified paths such that other paths which utilize non-congested portions of the network fabric will be selected by the failover or load balancing algorithm of the MPIO driver 112-1.

The dispatch weights are utilized by the MPIO driver 112-1 to determine which paths to utilize for submitting IO operations. In some embodiments, a dispatch weight having a higher value may be more favorable to the MPIO driver 112-1 than a dispatch weight having a lower value. In some embodiments, a dispatch weight having a lower value may be more favorable to the MPIO driver 112-1 than a dispatch weight having a higher value. In an illustrative embodiment, for example, where a first dispatch weight of a first path has a first value and a second dispatch weight of a second path has a second value, the first dispatch weight may be adjusted based at least in part on an obtained network congestion notification to a value that is less favorable to the MPIO driver 112-1 for submitting IO operations to the storage system than the second dispatch weight. In such a case, the MPIO driver 112-1 will now select the second path for dispatching IO operations instead of the first path after the adjustment.

In some embodiments, congestion logic 114-1 is configured to adjust the dispatch weights of the paths by an amount proportional to the amount of congestion. For example, the network congestion notification may comprise an indication of an amount of congestion that the portion of the network fabric is experiencing, e.g., latency, throughput, or another similar metric. This indication of the amount of congestion may then be utilized by the congestion logic 114-1 to determine how much to adjust the weights of the corresponding paths. For example, as the amount of congestion changes, the congestion logic 114-1 may be configured to proportionately adjust the dispatch weights for the corresponding paths. For example, if the congestion changes by a particular amount, e.g., 25%, the corresponding dispatch weights may also be adjusted by a corresponding amount, e.g., 20%, 25%, 30%, 35%, 50% or any other amount. Any other function for adjusting the dispatch weights based on the changes to the congestion may be utilized including, for example, linear adjustments, exponential adjustments, logarithmic adjustments, or any other adjustment function. If the congestion level of the portion of the network fabric returns to normal levels, the corresponding dispatch weights may be reset back to their original values by the congestion logic 114-1.

In a case where all of the non-congested paths are unavailable, e.g., the non-congested paths are dead, the MPIO driver 112-1 will utilize the paths identified to be congested. This is because the identified paths were not disabled but instead had their dispatch weight adjusted to a value that is less favorable as compared to paths which did not utilize congested portions of the network fabric. When those other paths are not available, the identified paths are now the most favored by dispatch weight for dispatching IO operations and will be utilized by the MPIO driver 112-1. In some cases, in the event that only the identified paths are available for dispatching IO operations, the MPIO driver 112-1 may limit or otherwise inhibit the use of the identified paths to only those IO operations that have a sufficient priority level. For example, the MPIO driver 112-1 may be configured to only utilize the identified paths for IO operations that meet a threshold priority level. If no IO operations having such a priority level are available for dispatching to the storage array, other IO operations may alternatively be dispatched along the identified paths by the MPIO driver 112-1 until such priority IO operations require dispatch.

Congestion logic 114-1 may also or alternatively be configured to change the path state of the identified paths from an active path state to a congested path state. The congestion logic 114-1 may be configured to pro-actively test the paths which have the congested path state to verify whether or not the congestion is still present on these paths. For example, congestion logic 114-1 may be configured to submit dummy data along the paths to determine whether the congestion is still present.

As an example, if the network component is still experiencing congestion it may generate a new network congestion notification based at least in part on the submission of the dummy data which may be obtained by the congestion logic 114-1 as described above. If the path testing determines that the paths are no longer congested, i.e., that the portion of the network fabric is no longer experiencing congestion and no network congestion notification is obtained in response to the dummy data, the congestion logic 114-1 changes the path state of the paths which are no longer congested from the congested path state to the active path state and the MPIO driver 112-1 dispatches IO operations along the paths as normal.

In some scenarios, the MPIO driver 112-1 may be configured with functionality or a load balancing algorithm which dictates that a single path at a time is utilized for dispatching IO operations until an IO threshold is reached before switching to a new path. The IO threshold may comprise, for example, a number of IO operations, a cumulative size of the IO operations or any other threshold value associated with the dispatch of IO operations along a given path. When the IO threshold is reached, MPIO driver 112-1 may select a new path for the dispatching IO operations based at least in part on the network congestion notification. For example, the new path may be selected based on the dispatch weighting of the paths where paths other than those identified to be congested will be selected first, i.e., have a more favorable dispatch weight. In another example, the new path may be selected based on the path state where paths having the active state are preferred over paths having the congested state.

Congestion logic 114-1 may also or alternatively be configured to provide the storage array 105 with an indication of which paths utilize the portion of the network fabric that is experiencing network congestion, e.g., via a vendor specific SCSI command. The storage array 105 in this case may be configured to service IO operations using paths comprising target ports which utilize portions of the network fabric for which no network congestion notification was received. In some cases, the storage array 105 may still be configured to utilize the paths comprising ports which utilize the portions of the network fabric which are experiencing congestion for priority IO operations in a similar manner to that described above for MPIO driver 112-1.

As described above, congestion logic 114-1 leverages network congestion notifications obtained from the components of the network fabric to pro-actively determine which paths are experiencing congestion and to either re-route the dispatch of IO operations from those paths to other non-congested paths or to reduce the load on those congested paths by prioritizing only those IO operations that meet a threshold priority level along those paths. This improves the efficiency and performance of the storage system as a whole since both failover and load balancing will either avoid or efficiently utilize the portions of the network fabric that are congested.

Illustrative embodiments of the techniques and functionality of congestion logic 114 will now be described in more detail with reference to the flow diagram of FIG. 3.

Figure 3:
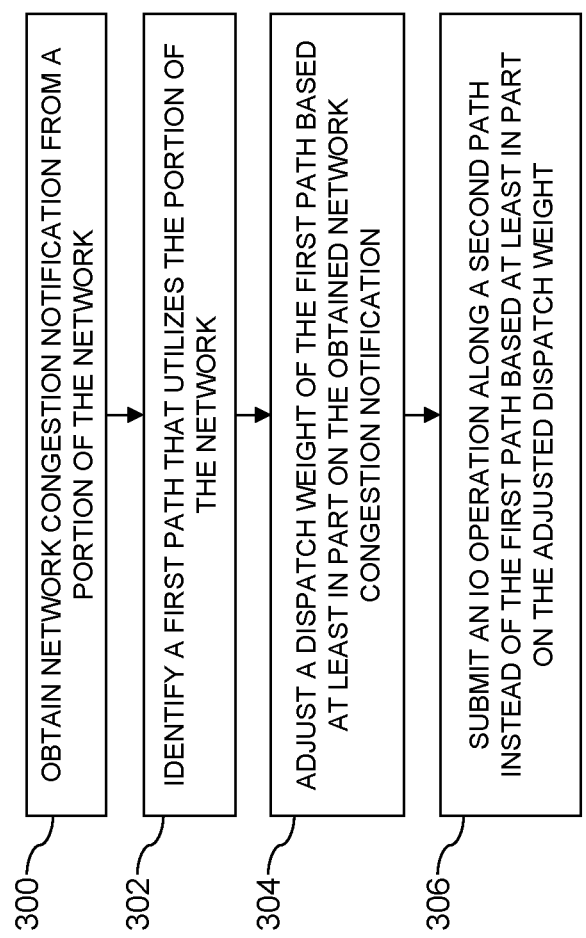
FIG. 3 is a flow diagram of an example process for congestion aware multipathing based on network congestion notifications in an illustrative embodiment.

The process as shown in FIG. 3 includes steps 300 through 306, and is suitable for use in the system 100 but is more generally applicable to other types of systems comprising multiple host devices and a shared storage system.

While the example process of FIG. 3 is described below from the perspective of host device 102-1, any other host device may be configured to perform one or more of the steps of the process of FIG. 3.

At step 300, congestion logic 114-1 obtains a network congestion notification from a portion of the network that is utilized by the host device 102-1 for submitting IO operations to the storage array 105. For example, the portion of the network may comprise the network device 204. The network congestion notification comprises an indication that the portion of the network is experiencing network congestion.

At step 302, congestion logic 114-1 identifies a first path that utilizes the portion of the network. The first path has a dispatch weight that is utilized by the MPIO driver 112-1 when determining whether or not to dispatch an IO operation along the first path.

At step 304, congestion logic 114-1 adjusts the dispatch weight of the first path based at least in part on the network congestion notification. For example, the dispatch weight may be adjusted from a first value to a second value which is less favorable to the MPIO driver 112-1 for dispatching IO operations to the storage array 105 than the first value. In one example, the dispatch weight may be adjusted in proportion to an amount of congestion being experienced by the portion of the network as indicated in the network congestion notification. For example, as the amount of congestion changes, the amount of adjustment from the first value to the second value may be adjusted such that the dispatch weight becomes more or and less favorable to the MPIO driver 112-1 for dispatching IO operations along the first path.

At step 306, congestion logic 114-1 submits an IO operation to the storage array 105 along a second path instead of the first path based at least in part on the adjusted dispatch weight of the first path. For example, the second path may have a third dispatch weight that is more favorable to the MPIO driver 112-1 for dispatching IO operations than the second dispatch weight of the first path. In some cases, for example, the third dispatch weight may be less favorable to the MPIO driver 112-1 than the first dispatch weight but more favorable to the MPIO driver 112-1 than the second dispatch weight.

Separate instances of the process of FIG. 3 may be performed in respective additional host devices that share the storage array.

The particular processing operations and other system functionality described in conjunction with the flow diagrams of FIG. 3 are presented by way of illustrative example only, and should not be construed as limiting the scope of the disclosure in any way. Alternative embodiments can use other types of processing operations involving host devices, storage systems and congestion logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different congestion logic arrangements within a given information processing system.

Functionality such as that described in conjunction with the flow diagram of FIG. 3 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The above-described functions associated with functionality for congestion aware multipathing based on network congestion notifications are carried out at least in part under the control of its congestion logic 114. For example, congestion logic 114 is illustratively configured to control performance of portions of the process shown in the flow diagram described above in conjunction with FIG. 3.

It is assumed that each of the other MPIO drivers 112 are configured in a manner similar to that described above and elsewhere herein for the first MPIO driver 112-1. The other host devices 102 of the system 100 are therefore also configured to communicate over the SAN 104 with the storage array 105, and the MPIO drivers 112 of such other host devices 102 are each similarly configured to select IO operations from a corresponding one of the sets of IO queues 110 for delivery to the storage array 105 over the SAN 104, and to perform the disclosed functionality for congestion aware multipathing based on network congestion notifications. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support congestion aware multipathing based on network congestion notifications.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent use of the functionality for congestion aware multipathing based on network congestion notifications as disclosed herein, congestion on the network fabric is not pro-actively tracked by the MPIO driver 112-1 which may result in inefficiencies in the load balancing and failover algorithms.

Such drawbacks are advantageously overcome in illustrative embodiments herein by utilization of congestion logic 114 to implement functionality for congestion aware multipathing based on network congestion notifications as described above. For example, by obtaining network congestion notifications that are generated by the components of the network fabric which are experiencing congestion, congestion logic 114 and MPIO driver 112-1 are able to pro-actively take this congestion into account during both failover and IO load balancing by either submitting IO operations to alternative paths that are not experiencing congestion or by reducing the amount of IO operations being submitted along the paths that utilize the congested portions of the network fabric. For example, the MPIO driver 112-1 may only submit the priority IO operations or submit fewer IO operations along the congested paths until the congestion clears up. Such techniques result in improved efficiency and performance in the storage system as the congestion on portions of the network fabric is both avoided and reduced.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the congestion logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers and congestion logic. Also, the particular configurations of system and device elements and associated processing operations illustratively shown in the drawings can be varied in other embodiments. For example, a wide variety of different MPIO driver configurations and associated congestion logic arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device comprising a processor coupled to memory, the host device being configured:
to obtain a network congestion notification from a portion of a network that is utilized by the host device for submitting input-output operations to a storage system, the network congestion notification comprising an indication that the portion of the network is experiencing network congestion;
to identify a first path of a plurality of paths as a path that utilizes the portion of the network;
to adjust a dispatch weight of the first path based at least in part on the network congestion notification; and
to submit an input-output operation to the storage system along a second path of the plurality of paths instead of the first path based at least in part on the adjusted dispatch weight of the first path;
wherein the dispatch weight of the first path is adjusted based at least in part on network congestion information obtained in association with the network congestion notification; and
wherein the dispatch weight of the first path is dynamically adjusted as an amount of network congestion changes.

2. The apparatus of claim 1 wherein the host device is further configured:
to determine that only paths which utilize the portion of the network are available for the submission of input-output operations to the storage system; and
to submit only input-output operations that have a higher priority than a threshold priority level along the paths which utilize the portion of the network based at least in part on the network congestion notification.

3. The apparatus of claim 1 wherein:
the network congestion information comprises an indication of the amount of network congestion that the portion of the network is experiencing; and
an amount that the dispatch weight of the first path is adjusted is determined based at least in part on the indication of the amount of network congestion that the portion of the network is experiencing.

4. The apparatus of claim 3 wherein:
adjusting the dispatch weight of the first path comprises adjusting the dispatch weight of the first path from a first value to a second value; and
the host device is further configured:
to set the first path to a congested state based at least in part on the network congestion information;
to test the first path for congestion based at least in part on the first path being set to the congested state;

to determine based at least in part on the testing that the first path is not congested;
to set the first path to an active state based at least in part on the determination that the first path is not congested; and
to adjust the dispatch weight of the first path from the second value to the first value based at least in part on the first path being set to the active state.

5. The apparatus of claim 1 wherein the host device is further configured:
to utilize a single path of the plurality of paths for the submission of input-output operations until a threshold value is reached; and
to select a third path of the plurality of paths instead of the first path for the submission of one or more additional input-output operations based at least in part on the threshold value being reached and the adjusted dispatch weight of the first path.

6. The apparatus of claim 1 wherein the host device is further configured to submit along the first path one or more input-output operations having a higher priority than the input-output operation submitted along the second path based at least in part on the network congestion information.

7. The apparatus of claim 1 wherein obtaining the network congestion notification from the portion of the network comprises obtaining the network congestion notification from a component of the network, the component of the network being configured to generate the network congestion information based at least in part on the component of the network experiencing the network congestion.

8. A method comprising:
obtaining a network congestion notification from a portion of a network that is utilized by a host device for submitting input-output operations to a storage system, the network congestion notification comprising an indication that the portion of the network is experiencing network congestion;
identifying a first path of a plurality of paths as a path that utilizes the portion of the network;
adjusting a dispatch weight of the first path based at least in part on the network congestion notification; and
submitting an input-output operation to the storage system along a second path of the plurality of paths instead of the first path based at least in part on the adjusted dispatch weight of the first path;
wherein the dispatch weight of the first path is adjusted based at least in part on network congestion information obtained in association with the network congestion notification;
wherein the dispatch weight of the first path is dynamically adjusted as an amount of network congestion changes; and
wherein the method is implemented in the host device, the host device comprising a processor coupled to a memory.

9. The method of claim 8 wherein the method further comprises:
determining that only paths which utilize the portion of the network are available for the submission of input-output operations to the storage system; and
submitting only input-output operations that have a higher priority than a threshold priority level along the paths which utilize the portion of the network based at least in part on the network congestion notification.

10. The method of claim 8 wherein:
the network congestion information comprises an indication of the amount of network congestion that the portion of the network is experiencing; and
an amount that the dispatch weight of the first path is adjusted is determined based at least in part on the indication of the amount of network congestion that the portion of the network is experiencing.

11. The method of claim 10 wherein:
adjusting the dispatch weight of the first path comprises adjusting the dispatch weight of the first path from a first value to a second value; and
the method further comprises:
setting the first path to a congested state based at least in part on the network congestion information;
testing the first path for congestion based at least in part on the first path being set to the congested state;
determining based at least in part on the testing that the first path is not congested;
setting the first path to an active state based at least in part on the determination that the first path is not congested; and
adjusting the dispatch weight of the first path from the second value to the first value based at least in part on the first path being set to the active state.

12. The method of claim 8 wherein the method further comprises:
utilizing a single path of the plurality of paths for the submission of input-output operations until a threshold value is reached; and
selecting a third path of the plurality of paths instead of the first path for the submission of one or more additional input-output operations based at least in part on the threshold value being reached and the adjusted dispatch weight of the first path.

13. The method of claim 8 wherein the method further comprises submitting along the first path one or more input-output operations having a higher priority than the input-output operation submitted along the second path based at least in part on the network congestion information.

14. The method of claim 8 wherein obtaining the network congestion notification from the portion of the network comprises obtaining the network congestion notification from a component of the network, the component of the network being configured to generate the network congestion information based at least in part on the component of the network experiencing the network congestion.

15. A non-transitory processor-readable storage medium having stored therein program code of one or more software programs, wherein the program code, when executed by a host device comprising a processor coupled to memory, causes the host device:
to obtain a network congestion notification from a portion of a network that is utilized by the host device for submitting input-output operations to a storage system, the network congestion notification comprising an indication that the portion of the network is experiencing network congestion;
to identify a first path of a plurality of paths as a path that utilizes the portion of the network;
to adjust a dispatch weight of the first path based at least in part on the network congestion notification; and
to submit an input-output operation to the storage system along a second path of the plurality of paths instead of the first path based at least in part on the adjusted dispatch weight of the first path;

wherein the dispatch weight of the first path is adjusted based at least in part on network congestion information obtained in association with the network congestion notification; and wherein the dispatch weight of the first path is dynamically adjusted as an amount of network congestion changes.

16. The non-transitory processor-readable storage medium of claim 15 wherein the program code further causes the host device:

to determine that only paths which utilize the portion of the network are available for the submission of input-output operations to the storage system; and to submit only input-output operations that have a higher priority than a threshold priority level along the paths which utilize the portion of the network based at least in part on the network congestion notification.

17. The non-transitory processor-readable storage medium of claim 15 wherein:

the network congestion information comprises an indication of the amount of network congestion that the portion of the network is experiencing; and an amount that the dispatch weight of the first path is adjusted is determined based at least in part on the indication of the amount of network congestion that the portion of the network is experiencing.

18. The non-transitory processor-readable storage medium of claim 15 wherein:

adjusting the dispatch weight of the first path comprises adjusting the dispatch weight of the first path from a first value to a second value; and the program code further causing the host device:

to set the first path to a congested state based at least in part on the network congestion information;

to test the first path for congestion based at least in part on the first path being set to the congested state;

to determine based at least in part on the testing that the first path is not congested;

to set the first path to an active state based at least in part on the determination that the first path is not congested; and to adjust the dispatch weight of the first path from the second value to the first value based at least in part on the first path being set to the active state.

19. The non-transitory processor-readable storage medium of claim 15 wherein the program code further causes the host device:

to utilize a single path of the plurality of paths for the submission of input-output operations until a threshold value is reached; and to select a third path of the plurality of paths instead of the first path for the submission of one or more additional input-output operations based at least in part on the threshold value being reached and the adjusted dispatch weight of the first path.

20. The non-transitory processor-readable storage medium of claim 15 wherein the program code further causes the host device to submit along the first path one or more input-output operations having a higher priority than the input-output operation submitted along the second path based at least in part on the network congestion information.

* * * * *